Patented June 26, 1934

1,964,010

UNITED STATES PATENT OFFICE 1,964,010

PROCESS OF MANUFACTURING AND MARKETING SAUSAGES

Charles H. Vogt, Philadelphia, Pa.

No Drawing. Application April 3, 1928, Serial No. 267,131. Renewed October 30, 1933

7 Claims. (Cl. 99—11)

The present invention relates to casingless sausages and processes of producing such sausages in a form suitable for marketing. This application is a continuation in part of my co-pending application Serial No. 218,113, filed September 7, 1927.

In accordance with the process set forth in the aforementioned application an edible skin or membrane is formed about the exterior surface of the sausage by a combined chemical and bacterial action in and of the protein and nitrogenous matter contained in the meat mixture from which the sausages are formed. The sausages having such an edible skin or protective membrane are produced according to the process of said co-pending application by first pre-forming the meat mixture into a sausage of the desired shape, this being done by stuffing the meat mixture into molds of a suitable size. The molds containing the preformed sausages are then transferred to a cooling room or chilling chamber and allowed to remain therein for a certain period of time. This treatment of the preformed sausages results in a setting of the meat mixture. The sausages are then ejected from the molds, placed upon screens, and exposed either to air or to forced filtered air currents. This air treatment results in the formation of a protective skin or membrane about the exterior surfaces of the individual sausages and is apparently the result of a combined physical, chemical, and bacterial action in and of the protein or nitrogenous matter contained in the sausage adjacent to and at the exterior surfaces of the sausages. The sausages are then smoked and cooked at predetermined temperatures and for predetermined times. The cooked sausages are then transferred to a cooling room and chilled whereupon they are individually wrapped in waxed paper, the wrapper being secured around the sausages in such manner as to completely enclose the same so that moisture is retained in the sausages and contact with the atmosphere with condensation of moisture on, and bacterial contamination of the surfaces of the sausages, is prevented.

The sausages produced by this method and which have been individually wrapped in waxed paper are an edible product and which are as acceptable to the trade as the casing sausages. These sausages are satisfactory as regards their marketability as long as they are sold to the ultimate consumer within a relatively short period of time after they have been wrapped in the manner above pointed out. In cases where such sausages had been kept for several days, however, it was noticed that the wrappers had undergone a change in appearance, the wrappers being soiled and greasy in appearance and the water-proof material dissolved in the grease and meat juices of the sausages. This was particularly noticeable in the wrappers of the sausages which had been exposed to warm temperatures particularly of a temperature corresponding to that prevailing in summer time. Upon removing the wrapper from the sausages it was discovered that the sausages had changed color and that a slime had begun to form about the exterior surface of the sausages.

Exhaustive investigations were then made with a view to determining the factors which brought about this destructive action in the sausages, and thereby impaired the marketability thereof. Such investigations established the fact that the moisture contained in the sausage about the exterior surface thereof, the waxed paper wrappings, and the manner in which the sausages were wrapped in the waxed coverings were contributing factors which combined to form an environment conducive to the rapid propagation of the bacteria associated with or present in the sausage. Ten different species of organisms were isolated from samples taken in the raw and finished products which generally are of the kind whose growth and activities are inhibited by the action of light and by chilling. The bacterial and chemical action mentioned makes its appearance in the form of a slime. It was determined that the bacteria which caused this sliming and deteriorating action in the sausages do not occur naturally in the raw meat ingredients, but are chiefly skin bacteria or organisms present in the soil and atmosphere, and are usually found on the utensils used and on the skin of the workers and are transferred to the sausages in the course of manufacture through the medium of atmospheric contact, the utensils, hands and clothing of the workers. Such species of bacteria are chiefly spherical organisms, inhibited by the action of light.

Also the fats and meat juices in the sausages and the oil or waxing in the paper were apparently mutually soluble, destroying the homogeneity of the paper surface and its water proof nature, and then weakening of the paper due to the action of moisture, resulting in the contamination of the sausages and destruction of the attractive appearance of the wrappers. This action was more pronounced in the case of the sausages exposed to temperature corresponding to temperatures prevailing in summer time.

As a result of these investigations, it has been found that casingless sausages can be produced which will not suffer material deterioration over long periods by producing a substantially sterile product, and either canning as more fully hereinafter set forth or removing any excess moisture about the surface of the protective skin or membrane formed by the combined chemical and bacterial action in and of the proteins and nitrogenous matter contained in the meat mixture, preferably chilling the substantially sterile sausages and then enclosing the sausages individually in a special wrapper, the wrapping operation being performed in a room in which the air is substantially sterile and so dry that moisture is not condensed on the sausages during the wrapping operation. The wrappers used for this purpose should be such that the material of which they are made is preferably transparent, substantially impervious to moisture, and resistant to the action of greases and meat juices and not mutually soluble therewith. The wrapping material should be light in weight, firm, and possess sufficient elasticity as to adhere to the outer surfaces of the sausages and to substantially seal it against the influences of the atmosphere. A wrapper which has been found satisfactory is that marketed under the trade name "Cellophane".

I have also discovered that by properly controlling the production of my improved casingless sausages a high grade product is secured of uniform diameter and length which is admirably suited for canning purposes, and a protecting membrane or skin may be formed around the sausages which may be immersed in brine and heated to 240° F. or more and will hold the sausage together without permitting substantial loss of meat juices in the brine or disintegration of the sausages over comparatively long periods of time. The product secured in this way may be canned in brine at temperatures high enough to insure thorough sterilization in hermetically sealed cans, giving a high grade meat product of superior flavor that may be removed from the cans in whole condition and will keep in excellent condition for long periods of time.

Accordingly, a primary object of the invention is the production of casingless sausages having protective membranes or skins externally formed thereon from the protein or nitrogenous matter contained in the meat of which the sausages are made which may be heated during processes for canning at temperatures of 240° F. or more, and will stand up satisfactorily when immersed in brine for canning purposes, and when wrapped individually for marketing.

Another object of the invention is the production of casingless sausages having protective external membranes thereof formed by the combined physical, chemical and bacterial action on the nitrogenous and protein matter of the meat mixture, which sausages are individually enclosed in a thin, transparent wrapper impervious to moisture and resistant to the action of the greases naturally contained in the sausages.

A further object of the invention resides in the provision of a novel process for making casingless sausages whereby the meat mixture is formed into sausages which are straight and substantially uniform in size and contour so as to permit the wrapping of the sausage in finished form in individual wrappers automatically, or to be placed in containers and canned without the use of artificial preservatives.

A still further object of the invention resides in the provision of a process for making casingless sausages whereby protective membranes or skins are formed about the exterior surfaces thereof by the breaking down and rearrangement of the proteins and nitrogenous matter naturally present in the meat mixture of which the sausages are made, and the substantial sterilization of the skins or membranes formed about the sausages either in canning or before wrapping for the market.

By way of example, a preferred process now in successful commerical use for forming my improved sausages comprises forming the uncooked meat mixture of which the sausages are made into the desired shape and then subjecting the formed sausages to controlled apparently physical, chemical, and bacterial action in and of the protein and nitrogenous matter of the sausage meat mixture, thereby effecting the formation of protective membranes or skins containing substantial quantities of protein or nitrogenous matter of generally less complex structure than the proteins normally present in the fresh meat, about the exterior surfaces of the sausages. The uncooked sausages with initial membranes formed thereon are subjected to a smoking action to effect the usual curing of the product and sterilization and reduction of active organisms present and at the same time to effect a toughening and strengthening of the protective membrane or skin. The smoked sausages are then preferably cooked, the temperatures being raised for purposes of further sterilization, are chilled in a manner to further sterilize the product and to inhibit growth of undesired organisms, and finally wrapped. If desired after smoking the sausages may be inserted into cans and cooked in the cans at sterilizing temperatures all as will more fully hereinafter appear.

Excellent sausages may be produced in accordance with this invention by proceeding in the following manner. A meat mixture is formed by mixing together beef and pork preferably in the ratio of 200 pounds of beef to 180 pounds of pork, and adding the usual spices and other common ingredients of sausage mixtures thereto. The mixture is then subjected to a disintegrating or chopping action, and comminuted to the required degree, and preferably to a comparatively fine state.

During the chopping or disintegration of the sausage mixture it is preferred to add a certain amount of water in the form of ice which should preferably be manufactured from sterile water to eliminate so far as possible contaminating bacteria that naturally appear in water. The addition of the ice serves the double function of initially reducing the temperature of the meat mixture, and supplying the mixture with water in addition to the natural moisture contained in the meat from which the mixture is formed.

The sausage mixture thus prepared is then stuffed or packed into molds of the desired size and shape. This may be done by the ordinary sausage stuffer or any of the other well known elements designed for such purposes. The molds may be made of any construction but molds having smooth tubular bores of uniform diameter and length of the type shown in my co-pending application Serial No. 255,941, filed February 21, 1928, made of aluminum, rust proof iron, nickel, or material of like character readily sterilized and free from unevenness to minimize contamination of meat when in contact therewith are preferably used. In place of tubular molds being employed in the step of preforming the sausages, molds which open lengthwise may be used if desired or the sausages may be stuffed into artificial casings and linked in uniform lengths. The tubular molds made of metal are, however, preferred. Whatever the construction of metallic molds employed may be, it is important that the interior surface of the molds be smooth so that the exterior surface of the preformed sausages may be smooth and even in character.

The molds loaded with the sausage mixture are then transferred to a cooling chamber or space or are passed through brine maintained at a suitable temperature, preferably from 0° F. to 48° F. The molds are retained in the cooling chamber for a period of time sufficient to permit the sausages to set to the form of the molds, preferably without freezing throughout so that they will retain their shape after being removed from the molds. The time required to cause setting of the sausages will depend upon the temperature of the cooling chamber or upon the initial temperature and condition of the meat mixture. By subjecting the sausages to a temperature of 0° F. a few minutes they are found to be shell frozen and in suitable set condition while when placed in the usual packing house chilling room the meat sets sufficiently in from 2 to 24 hours time, at the expiration of which time the molds are removed from the cooling room, and in practice the sausages have been permitted to set in the cooler for as long as 48 hours or more.

The formed sausages which have been set to shape in the molds are then removed from the molds in any desired manner. If the formed sausages are in tubular molds, the sausages are, as disclosed in my co-pending application, Serial No. 255,942, filed February 21, 1928, ejected therefrom by means of plungers, and deposited or placed upon open mesh wire screens to facilitate the handling thereof during subsequent operations. The screens used for this purpose as disclosed in said co-pending application Serial No. 255,942, filed February 21, 1928, are provided with supporting wires parallelly disposed or other guides so arranged as to hold the adjacent sausages spaced apart the necessary distance for proper smoking to maintain the formed sausages straight without covering a substantial portion of the surfaces of the sausages and retaining the sausages between these guides intact during the subsequent operations. Unless the sausages are properly supported they tend to curl with the result that they either retard the wrapping or cannot be wrapped automatically.

The casingless sausages as they come from the molds generally have a smooth glossy appearance, are fairly firm to the touch, and retain their form. During the chilling or cooling step, a "setting" takes place, probably due partly to the solidification of the fat, and possibly due partly to the absorption of water by the colloids.

The formed sausages supported upon the wire screens are then subjected to a vapor bath or subjected to a moist atmosphere at a temperature of 90° F. to 100° F. for about 10 minutes or more or less depending upon the thickness and texture of membrane desired, a longer treatment being given when a heavier membrane is desired for canning purposes requiring immersion in brine. The screens containing the sausages are then immediately transferred to a closed compartment having steam radiating coils arranged in the bottom thereof. The closed compartment preferably comprises a baffle plate structure which is disposed directly above the steam coils together with a fan arrangement to blow the steam filtered and sterile air through the radiating coils. The baffle plates are so arranged as to deflect the air upward and thus distribute the air current in an approximately uniform manner over the entire mass of sausages supported upon the screens. The wire screens supporting the sausages are placed in the closed chamber at a point above the baffle plate. The air circulating through the closed chamber is preferably filtered and dry and is preferably maintained at a temperature of about 100° F. to 120° F. This air treatment of the sausages is continued for a period of about 3 minutes which may, however, be varied to vary the quality and texture of the skin. During this treatment partial dehydration of the surface occurs and a protective coating or membrane forms about the exterior surfaces of the individual sausages after the physical, chemical, and bacterial changes caused in the vapor treatment stage. This protective membrance is apparently the result of a combined physical, chemical, and bacterial action in the protein or nitrogenous matter contained in the sausage adjacent to and at the exterior surface thereof. The air treatment also results in a partial removal of the moisture contained in the sausage.

The screens supporting the formed sausages may then be transferred to cages and placed in an ordinary smoke-house wherein they are further dried while being smoked to the desired degree. Preferably the smoking is so regulated that it begins at a temperature of approximately 110° F. to 120° F. and concludes when a temperature of approximately 165° F. to 170° F. is reached. The smoking period, when carried out in the preferred manner, requires approximately from 2 to 4 hours, depending upon atmospheric conditions and the initial condition of the sausages. During the smoking process the protective membranes formed about the exterior surfaces of the sausages by the dehydrating treatment or treatment with dry air is firmly fixed or set and is toughened to the desired degree. The membrane at this stage of the process may be made so as to closely resemble sheep casing used in the high grade of Frankfurter sausage as regards texture and appearance. The smoking also has a germicidal action on organisms of the species generally known as "Proteus" and found appearing naturally in the meat of the initial mixture, but does not kill the spherical skin organisms which cause sliming.

The smoked sausages of uniform length and diameter may now to be put into cans preferably of such size that six sausages may be tightly packed into each can with one sausage in the center and five sausages packed tightly around the central sausage so that the can is substantially filled by the sausages. In this way a minimum space to be filled by brine exists, and it is found that effective sterilization of the central sausage without over-cooking the outer sausages, may be secured while a minimum amount of brine, is required, all of which is important in the successful canning of my improved sausages to prevent disintegration thereof, or injury thereto by over-cooking and to prevent loss of flavor due to absorption of meat juices by the presence of an excessive amount of brine. Instead of cans, it will be understood that, glass jars of suitable size may be used, packed as above set forth. The packed cans or jars are then filled with hot brine for example or a consommé of meat broth. A comparatively small quantity of brine or consommé is sufficient since the sausages are of uniform shape, as above pointed out and substantially fill the cans or jars. The use of a comparatively small quantity of brine or consommé is important so that comparatively little of the meat flavor is absorbed thereby over long periods of time. The filled cans or jars are then closed and tightly sealed after which they are heated to a temperature sufficient to cause the sterilization of the surfaces of the sausages contained therein, and thereby kill the bacteria that causes sliming, it having been determined that the death point of such bacteria is at a temperature of about 194° F. This sterilization is satisfactorily effected by subjecting the sealed cans or jars to temperatures of 230° F. to 240° F. or higher, from 15 to 30 minutes. Owing to the nature of the membrane on the sausages, the heated cans or jars must then be suddenly chilled. The chilling is an important step of my canning process, as it prevents disintegration of the sausages, and sets the sausages in the cans or jars, thus enabling them to retain their shape, and quality indefinitely. The sudden chilling of the cans or jars causes the contraction of the pores of the membrane about the exterior surface of the sausages and a hardening of the greases about the outer surface of the sausages, thereby forming a seal which acts to prevent the egress of the meat juices contained in the sausages and the ingress of the brine into the sausages. When treated in this way, canned casingless sausages of superior flavor and keeping qualities are produced, the non-spore forming organisms not killed in the smoking, being killed by the heating without destroying the high grade flavor of the product. The temperature of 240° F. may be used to cook the sausages safely without causing bursting of their membranes in the cans or jars and this is a novel and valuable characteristic of my improved product, permitting the production of high grade canned sausages that may be processed at sufficiently high temperatures to eliminate the necessity for use of artificial preservatives such as benzoate of soda, without sacrificing the flavor of the product.

Instead of being canned, the smoked sausages may also be transferred while held in separate and straightened condition by the guide wires of the screens to a cooker or cooking room and cooked for a period which may be from 6 to 8 minutes or longer. The cooking is preferably carried out in an atmosphere of water vapor which surrounds each individual screen supported sausage, although other methods of cooking may be employed if desired. In such a case, the cooking is started at a temperature of about 170° F. and the temperature gradually increased so that during the latter part of cooking the temperature is approximately from 194° F. to 200° F. for the purpose of killing the spherical non-spore forming organisms not killed in the smoking process which causes the sliming effect on the sausages as it has been found that such temperatures are above the death point of these bacteria which include the skin organisms. The cooking of the sausages further toughens and increases the tensile strength of the protective membranes formed about the exterior surfaces of the individual sausages. The separation of the individual sausages uniformly and subjecting them individually to a cooking atmosphere, permits individual uniform treatment of each sausage, insuring effective sterilization and destruction of spherical organisms in a minimum time and at minimum temperatures.

It is to be noted that the treatment of the preformed sausages, that is from the time the sausages have been ejected from the molds on to the wire supporting screens up to and inclusive of the cooking steps, involves the maintenance of substantially uniform separation or spacing and subjection of the sausages to individual uniform treatment at progressively increasing temperatures. This is very desirable as the best meat products are obtained when alternate high and low temperatures are avoided. It is to be furthermore noted that the treatment up to the time of the smoking is such as to promote the growth of organisms particularly on the surface of the sausages and to increase the bacteria present while beginning with the smoking the treatment is such as to progressively inhibit and decrease the growth of organisms and bacterial activity.

After the sausages have been cooked they may be chilled by causing a tepid spray of preferably sterile water to play upon the thus cooked sausages supported upon the wire screens. The chilling of the cooked sausages by means of a tepid spray of water causes the outer pores of the sausages to contract and also tends to effect a hardening of the greases about the surface of the sausages, thereby restricting the escape of moisture and meat juices contained in the interior of the sausages preventing loss of flavor of the product.

The tepid spray of water may if desired contain a weak solution of sodium hypochlorite containing 2.5 parts of available chlorine, for example, of about ⅖% strength, the surface of the sausages are thus made of a more sterile condition. The sodium hypochlorite is a germicide and decomposes readily into sodium chloride. Upon decomposition of the hypochlorite a slight deposit of salt is precipitated about the surfaces of the sausages. Such salts act as a preservative for the sausages and also keep same in a substantially sterile condition as well as giving flavor to the product.

The sausages, after being subjected to the chilling with a spray of tepid water, may be treated to remove excess moisture from the surface thereof by exposing for a short time, for example 1 or 2 minutes to a dehydrating current of warm, comparatively dry and preferably sterilized air or gas. The dehydrating treatment is preferably carried out by transferring the screens carrying the sausages into a closed chamber through which a current of filtered air is caused to circulate. This drying is for the purpose of removing the moisture which is present in the exterior surfaces of the sausages without removing or driving off any considerable portion of the moisture contained in the interior of the sausages.

In place of chilling the cooked sausages with a tepid spray of water and then drying the surface thereof by means of air or gas currents, as above set forth, said sausages may be immediately transferred on the screens to a cooling room or chamber to be cooled by subjecting them to currents of dry cooling or chilling air or gases to be chilled for the market.

The skins or membranes formed on the sausages in carrying out the process as above set forth initially simulates in appearance the animal casing ordinarily used on Frankfurters and sausages but differs materially from animal casings in that it is wholly edible, more readily digestible and has a high food value, and when exposed to air the skin or membrane rapidly changes form, becomes darker and toughens. My improved sausages must, therefore, be specially handled in order to permit the practical marketing thereof, as in ordinary atmosphere the sausages rapidly dry out and toughen unless they are kept cold, and rapidly become unsuitable for marketing. If a light membrane is formed initially, and the sausages are kept cold the skins will upon exposure to air become slightly tougher and darker, gradually changing to the desired condition for marketing.

The sausages thus treated may then be immediately enclosed in individual wrappers made of a material which is transparent and impervious to moisture and greases; but are preferably thoroughly cooled and maintained in dry sterile condition before wrapping. This wrapping of the sausages is preferably done by means of an automatic wrapping machine of the general type disclosed in my Patent #1,811,163 granted June 23, 1931. The wrappers most suitable for this purpose are made of a material which is marketed under the trade name "Cellophane". These wrappers give the finished sausages an attractive appearance.

After wrapping, the sausages may then be transferred to a cooling room and cooled to a temperature of approximately 26° F. to 28° F. This cooling treatment causes the sausages to be maintained in a substantially sterile and marketable condition. The sausages thus produced also contain moisture in a sufficient amount to make them edible and also palatable to the taste. The Cellophane wrapping properly applied protect the sausages from atmospheric influences, and inhibit the oxidation of the product or propagation of the bacteria which may be associated with the sausages due to the substantial exclusion of air therefrom and the admission of light through the wrappers which, as hereinafter pointed out, materially inhibits undesirable bacterial growths.

In place of wrapping the sausages immediately after the drying, they may be cooled to approximately 26° F. to 28° F. by transferring them on the screens to a chilling room through which dry substantially sterile air is caused to circulate at a temperature of 26° F. to 28° F. and then wrapped.

In an endeavor to determine the composition of the protective membrane formed about the exterior surfaces of casingless sausages manufactured in the manner above described as well as the cause of its formation, exhaustive investigations have been made, the results of which indicate that the membrane is formed by the breaking down of the proteins, nitrogenous and like compounds contained in the meat into simpler compounds, and indicate that the material for a suitable skin or membrane may possibly be formed independently of the sausage meat proper and applied to the sausage by dipping or spraying or like operations, and such methods of forming my improved product, if commercially feasible, are contemplated as within the scope of my invention.

Analyses show an increase in the water soluble proteins (serums, gelatin, proteoses, etc.) in the newly formed membrane before smoking over those present in the raw untreated meat mixture. By way of example, in one set of analyses about 15 per cent of water soluble proteins were found in the freshly comminuted meat mixture, while in the membrane before smoking 21.5 percent water soluble proteins were found. A change in the character of these water soluble proteins towards the point of simpler compounds was indicated as follows. In the original comminuted meat about 6.53 percent of proteoses based upon the total protein content was found, whereas in the analyzed newly formed unsmoked membrane about 16.43 percent was found. The water soluble coagulable proteins in the analyzed samples did not decrease in proportion to the increase of the proteose proteins and this distinctly points to a change in the structure of the proteins and which, of course, means a change in the properties and this change indicates probably hydrolysis of the protein molecules, and that the coating or membrane comprises hydrolyzed proteins. It is to be understood, however, that the analyses given are for a particular product and that the percentages and proportions may vary widely in my improved product depending upon the initial mixture, its condition, and the particular method of treatment and surrounding conditions during the skin formation, without departing from the spirit of my invention.

The smooth, tough, elastic skin formed about the exterior surface of the sausage according to this invention, is produced, or may be produced as the result of a combined physical, bacterial and chemical action in a dehydrating atmosphere containing an oxidizing element or oxygen containing compound with the simultaneous production of amino acids. The characteristics of the skin are its smoothness, elasticity, and tensile strength and the gradual and final, partial or complete disappearance of the individual outline of the meaty fibres to give place to a homogeneous whole acting as a protective coating to the formed sausage, and which is distinctly and physically separable from the interior of the sausage. The evenness and smoothness of the membrane are apparently accompanied by an increase in the water soluble proteins through hydrolysis, or other chemical or bacterial action, and certain proteose proteins produced during the hydrolysis are apparently essential in the formation of the membrane. Furthermore, the membrane of the smoked Frankfurter is apparently fixed by the process of smoking, which coagulates the coagulable water soluble proteins and "sets" the other proteins present, and is apparently further set and toughened by proper cooking, and exposure to air after cooking.

It has been determined that the skin or membrane formed about the exterior surface of the sausages by a combined chemical and bacterial action on the protein and nitrogenous matter contained in the meat mixture of which the sausage is made, should be conditioned in such manner as to remove the moisture about the external surface of the skin or membrane before the sausages are individually wrapped in suitable wrappers. Further, the sausages themselves should be cooked in such manner as to kill or destroy any of the slime forming bacteria which may be associated with the sausage. Also, the wrappers in which the sausages are enclosed and tightly sealed against the influences of the atmosphere should be made of a material which is transparent, impervious to moisture, resistant to the action of greases and meat juices, and should not be mutually soluble with the meat juices and greases, possess sufficient elasticity and tensile strength to adhere firmly to the sausage. Sausage treated in such manner as to control or substantially eliminate the factors which contribute to the impairment of the marketability of casingless sausages have been found to show no destructive or deteriorating action over long periods.

By care in sterilization of the utensils and apparatus, and in the handling of the material, the introduction of spore forming organisms may be avoided, and the non-spore forming organisms may be sterilized and killed in the treatment producing a substantially sterilized product which should be carefully handled in the chilling and wrapping stages to avoid re-inocculation of the product by compelling workers to use substantially sterile gloves and clothing.

The sausages having this protective membrane formed thereon, should be cooked in such manner that at the last stage of the cooking period, the temperature should be approximately 194° F. or more for a period of time sufficient to produce death of the spherical organisms that cause the sliming action. For canning purposes, a thicker skin or membrane may be produced than is desirable when the sausages are to be marketed in individual wrappers.

After the cooking of the sausages, it is important that the sausages to be marketed in wrappers be dehydrated in such manner as to remove substantially all free moisture that has collected upon and about the exterior surfaces of the protective membranes or skins. This may be accomplished by drying the cooked sausages, that is, subjecting the cooked sausages to a drying in air sufficient only to remove the free or excess moisture which has collected about the exterior surfaces of the skins or membranes. This drying of the outer surfaces of the protective membranes or skins of the sausages is for the purpose of materially lessening the incidence to bacterial growth of all kinds. The degree of sterilization may be considerably improved if the cooked sausages are subjected to a chilling by causing a tepid spray of sterile water to play upon the sausages and then immediately subjecting the sausages chilled in this manner to a drying in the manner above pointed out.

It has been found that the membrane of skin of the sausages is rendered more formidable against the destructive action of the sliming form of bacteria if the membrane or skin has been impregnated with a chemical having germicidal properties. For example, if the cooked sausages are chilled by means of a tepid spray of water containing a weak solution of sodium hypochlorite, that is, a hypochlorite solution having 2.5 percent of available chlorine, and immediately dried by subjecting them to a current of dry air, the drying being carried out in such manner that only the moisture which has been collected about the exterior surfaces of the membranes or skins is expelled, the skins or membranes are not only preserved but are also in better condition for resisting the action of the sliming bacteria.

Although it is essentially that the outer surfaces of the membranes or skins formed about the sausages be sterile, and substantially free of excess moisture before the sausages are individually encased in suitable wrappers in order to control or restrict the action of the sliming bacteria, present in the sausages, it is also important that the wrappers utilized for such purpose be such that the material of which they are made is transparent, substantially impervious to moisture, and resistant to the action of and not mutually soluble with greases, and further that the wrapping be preformed in a room in which the air is substantially dry. In other words, the wrapping of the sausages should be carried out in such manner that moisture is excluded insofar as it is possible. Wrappers which are transparent to the actinic light rays have been selected in order to inhibit the propagation of slime forming organisms if any be present in the sausage as it has been determined that such organisms are inhibited by the action of light. Wrappers made of a material known as "Cellophane" possess the desired properties.

While preferred processes of producing sausages having membranes or skins formed thereon from the protein and nitrogenous matter of the meat mixture of which the sausages are made, the particular manner of treating the sausages thus formed, and of encasing them in containers or wrappers has been described, it will be apparent to those skilled in the art that the details of the invention may be varied widely without departing from the scope thereof as defined by the appended claims.

This application is restricted to the canning process forming a part of the disclosed invention. Other and broader phases of the invention form the subject matter of other applications.

Having thus described the invention, what is claimed as new and desired to be secured by Letters Patent is:

1. The process of making sausage which comprises confining a meat mixture in a container of a predetermined size to form a sausage, cooling the sausage sufficiently to cause it to set to the form of the container, exposing the thus treated sausage to the action of moisture and air currents at a temperature of 120° F., or less to form a protective membrane thereon from the material of which the sausage is made, smoking the sausage, and canning the smoked sausage.

2. The process of making sausage which comprises combining a meat mixture in a mold of a predetermined size to form a sausage, cooling the sausage sufficiently to cause it to set to the form of the mold, exposing the thus treated sausage to moisture and to air currents at a temperature of 120° F., or less to form a protective membrane thereon, smoking the sausage, placing the sausage in a brine solution in a can, cooking the smoked sausage while in said solution at a temperature of about 194° F. or higher, and chilling the cooked sausage.

3. The process of making sausages and preparing them for the market which comprises confining a meat mixture in molds of a predetermined size to form sausages; chilling the sausages while in the molds; removing the chilled sausages from the molds and treating them to form a protective membrane thereon from the material of which the sausages is made; smoking the sausages after the formation of the membranes thereon; packing the sausages tightly in a container in a manner to provide small voids between the sausages and the walls of the container; filling the spaces between the sausages with a liquid; cooking the sausages in the container and chilling the cooked sausages suddenly after cooking.

4. The process of preparing sausages for the market which comprises molding a comminuted meat mixture in the form of sausages each having a smooth outer surface, subjecting the molded sausages to a treatment carried out at a temperature of 120° F. or less to cause the formation of a homogeneous membrane on the surface of said sausages, smoking the sausages to toughen the membranes, placing the sausages in a can in a manner to provide small voids between the individual sausages, and between the sausages and the walls of the can, adding a canning solution to fill said voids, hermetically sealing said can, cooking the sausages while in said can in a manner to sterilize the sausages without bursting the membranes formed thereon, and chilling the cooked sausages to close the pores thereof to minimize absorption of said solution.

5. The process of preparing sausages for the market which comprises molding a comminuted meat mixture in the form of sausages having smooth outer surfaces, subjecting the molded sausages to a treatment carried out at a temperature of 120° F. or less to cause the formation of a homogeneous membrane on the surface of said sausages, treating the sausages to toughen the membrane, placing the sausages in a can in a manner to provide small voids between the individual sausages, adding a canning solution to fill said voids, hermetically sealing said can and cooking the sausages while in said can in a manner to sterilize the sausages without bursting the membrane formed thereon.

6. The process of making and canning sausages, including the steps of shaping a meat mixture into sausages, forming a membrane of protein matter at a temperature approximately 110° F. about the exterior surface thereof of sufficient strength, texture and homogeneity from the meat mixture of which the sausage is composed to withstand cooking in a brine or like solution without bursting of the membrane, placing a plurality of the sausages in a canning receptacle shaped to minimize the voids between adjacent sausages and between the sausages and the walls of the receptacle, filling the voids in the receptacle with a brine or like solution, and cooking the sausages in said solution at a temperature capable of destroying any slime forming bacteria associated therewith.

7. The process of making sausages and preparing them for the market, including the steps of shaping a meat mixture into sausages, forming a membrane of protein matter about the exterior surface thereof from the material constituting the sausages at a temperature approximately 110° F., smoking the sausage at a substantially higher temperature, placing a plurality of the sausages in a canning receptacle and cooking them at a temperature of 194° F. or higher, and suddenly chilling the thus cooked sausage.

CHARLES H. VOGT.